(No Model.)
A. STAUB.
STOVE PIPE THIMBLE.
No. 385,212. Patented June 26, 1888.
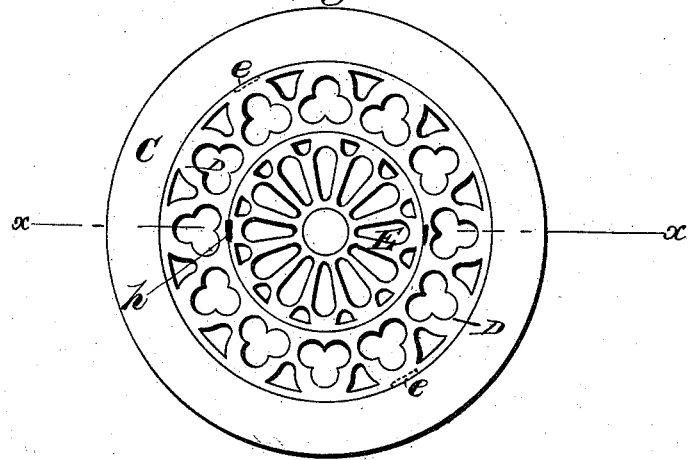
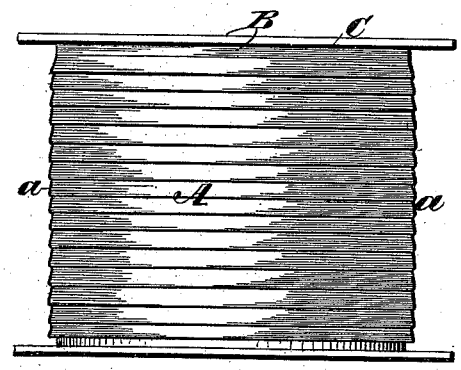
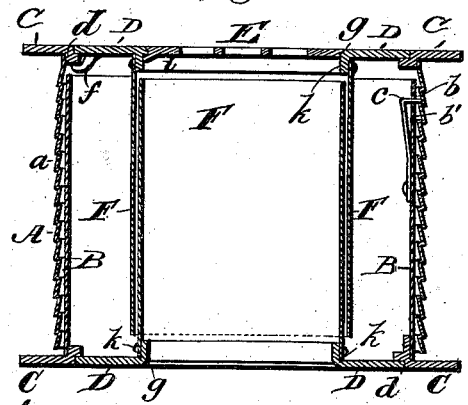
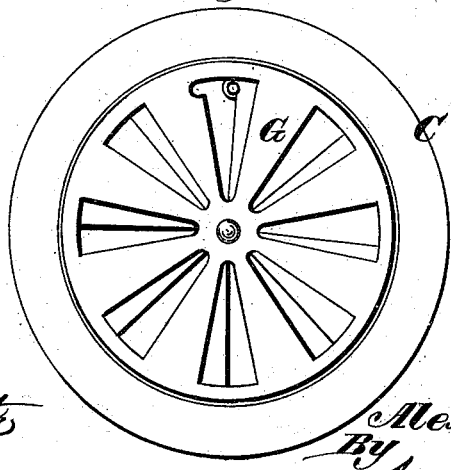
Witnesses.
Robert Everett,
Percy B. Stills.
Inventor:
Alexander Staub,
By James L. Norris.
Atty.

United States Patent Office.

ALEXANDER STAUB, OF FORT WAYNE, INDIANA.

STOVE-PIPE THIMBLE.

SPECIFICATION forming part of Letters Patent No. 385,212, dated June 26, 1888.

Application filed May 6, 1886. Serial No. 201,325. (No model.)

*To all whom it may concern:*

Be it known that I, ALEXANDER STAUB, of the city of Fort Wayne, in the county of Allen, in the State of Indiana, have invented new and useful improvements in stove-pipe thimbles to be used as such, or as ventilators or as registers interchangeably, of which the following is a full and exact description.

The object of my invention is to provide a ventilated stove-pipe thimble capable of being easily adjusted to the thickness of the floor or partition in which it may be placed and readily convertible into a ventilator or into a register, as occasion may require.

To this end my invention consists in the construction and combination of devices hereinafter described and claimed.

In the annexed drawings, illustrating the invention, Figure 1 is an end view of a ventilated stove-pipe thimble constructed according to my invention. Fig. 2 is an elevation of the same. Fig. 3 is a longitudinal section in the line $x$ $x$ of Fig. 1. Fig. 4 is a plan view of a register which may be placed in one end of the thimble.

As usual in adjustable devices of this class, the thimble is composed of two metallic cylinders, A and B, each of which is fastened to a separate annular flanged plate, C, the cylinders A and B being of such relative diameter that one will telescope within the other. The outer cylinder, A, is formed with transverse corrugations $a$ $a$, as shown. These corrugations $a$ $a$ strengthen the cylinder and serve as a ratchet for engaging automatic spring-catches $b$, attached to the interior of the inner cylinder, B, which is provided with slots $b'$, through which the hook ends $c$ of the catches $b$ project, as shown. The cylinders A and B are thus held securely together in any position to which they may be adjusted. Any desired number of catches $b$ $c$ may be employed, and they are preferably pivoted in the inner cylinder, B, in such a manner that they can be lifted out of the slots $b'$ and turned aside, so as to rest against the interior of the cylinder B for the purpose of permitting the cylinders to be moved freely on each other in either direction. It is obvious that instead of the corrugations and spring-catches any other suitable fastening can be employed.

The annular flanged plates C C are each made with an inner rabbeted edge, $d$, for the purpose of providing a seat for any plate, such as D, E, or G, that may be fitted to it. In the rabbeted portion of each annular plate C are formed notches or recesses $e$, (shown by dotted lines in Fig. 1,) for the purpose of permitting the passage of lugs $f f$, attached to such other plate, as D, whereby the latter can be secured in place. The lugs $f f$ are located on the under side of the annular perforated plate D near its outer periphery, so as to pass through the recesses $e$ $e$ and engage the under surface of the flanged plate C when the plate D is turned a little in its seat, the lugs $f f$ thus serving to hold the plates C and D together. The inside periphery of the annular perforated plate D is of the proper diameter to fit a stove-pipe passed through said plate. This annular plate D is also constructed with a rabbeted inner edge, $g$, having one or more notches or recesses, $h$, formed therein for the same purpose as in the annular flanged plate C. Instead of passing a stove-pipe through the central opening of the annular plate D, a perforated cap or center plate, E, may be seated in the rabbeted inner edge $g$ of the said annular plate. This central plate, E, is provided on its under side with lugs or catches $i$ $i$, to secure it in place in the same manner that the plate D is fastened.

On the inner side of each plate D, at or near its inner edge, is an annular flange or rim, $k$, for attachment of one of the inner metallic cylinders, F F', which are of such diameter that one will receive and move on the other, thus forming an adjustable double thimble.

Instead of the separate plates D and E, it is obvious that a single perforated ventilating-plate without central pipe-hole may be seated in the rabbeted inner edge of the annular flanged plate C, though I prefer the construction herein described, as being more convenient and affording a greater range of use.

A register-plate, G, of any suitable construction, may be seated, if of large size, in the inner rabbeted edge $d$ of the annular plate C, or, if of smaller size, in the inner rabbeted edge $g$ of the annular plate D, as preferred.

It will be seen that by a simple and ready adjustment or interchange of parts the thimble and its described accompaniments can be conveniently employed for several useful purposes. By employing the adjustable cylinders A B and flanges C C alone a plain stove-pipe thimble is provided. The addition of the annular perforated plates D D affords an adjustable ventilated stove-pipe thimble. By attaching the inner cylinders, F F', a double-bodied adjustable ventilated stove-pipe thimble is provided. The perforated plate E affords a ventilator when the stove-pipe is not in use; or, if desired, the plates D and E may be replaced by a register, G, as above described.

I am aware that an adjustable stove-pipe thimble is not new, and that it is old to provide such thimbles with inner cylinders and with ventilating plates and registers. These, therefore, I do not broadly claim; but

What I claim as my invention is—

In a stove-pipe thimble, the combination of the adjustable cylinders A B, the annular flanged plates C C, secured to said cylinders and provided with inner rabbeted edges, $d$, the annular perforated plates D D, having annular inner rims or flanges, $k\ k$, and the inner cylinders, F F', attached to said flanges, substantially as described.

ALEXANDER STAUB.

In presence of—
H. C. HARTMAN,
OLIVER E. FLEMING.